UNITED STATES PATENT OFFICE.

JOSEPH ANTHONY WEIGER, OF UNION HILL, NEW JERSEY, ASSIGNOR TO INDEPENDENT LAMP & WIRE COMPANY, INC., OF WEEHAWKEN, NEW JERSEY, A CORPORATION OF NEW JERSEY.

METAL ALLOY.

1,321,170.          Specification of Letters Patent.      Patented Nov. 11, 1919.

No Drawing.        Application filed August 25, 1919. Serial No. 319,664.

*To all whom it may concern:*

Be it known that I, JOSEPH ANTHONY WEIGER, a citizen of the United States, and a resident of Union Hill, Hudson county, New Jersey, have invented certain new and useful Improvements in Metal Alloys, of which the following is a specification.

This invention relates to improvements in metal alloys and the object is to provide an improved alloy suitable for use as face plates or contact points for electric make and break contacts and magnetos, or other electrical devices that are apt to become pitted or rapidly worn in use through the electric spark.

The particular object of the invention is to make a special alloy suitable for such purposes as those above mentioned which will be practicable in use and which will supplant the use of pure platinum or tungsten and which will be better than silver, and will be economical to manufacture.

It is especially desirable to be able to work such an alloy on a heading or rivet machine, and thus prepare the same for such use as face plates of electric make and break contacts or magneto points for the reason that the manufacture of these products having a tungsten face plate is rather expensive and cumbersome in view of the fact that tungsten disks forming the face plates must be cut from rods or punched out of plates and then manufactured into contacts or magneto points.

A definite alloy in accordance with this invention has been produced and has given excellent results when tested as magneto or contact points, and which is much cheaper than either platinum or tungsten. Numerous tests have been made using this alloy for contact and magneto points and they have been compared directly with tungsten and platinum and the results have shown them to stand up in use as well as or even better than either tungsten or platinum.

The particular alloy made in accordance with the present invention consists of silver, copper and platinum in the following portions by weight:

77% to 80% silver.
20% to 18% copper.
3% to 2% platinum.

In forming the alloy the silver and the copper are preferably in the form of small particles such as chips, filings, or powder, and the platinum is preferably platinum powder.

The alloy is prepared by placing silver chips, filings, or powder and copper chips filings or powder into a carbon crucible in the above mentioned proportions. The mixture of silver and copper is then heated to a temperature of about 1200 degrees C. at which temperature the metals assume a molten condition and alloy. After the above metals have been melted about five minutes platinum powder in the amount indicated above is added and the molten mass is stirred with a rod which does not melt at this temperature, for example, with a dry carbon rod. The entire mass is again heated to about 1200 degrees C., and removed from the furnace and again stirred for about a minute to insure thorough mixing of the different constituents. The steps of heating and stirring may be repeated a number of times in order to insure the production of a thoroughly homogeneous alloy. The melting and alloying operation is preferably carried out in an atmosphere of hydrogen, rather than air in order to prevent oxidation of the alloy.

After a uniformly homogeneous alloy is produced the molten mixture may be poured into a carbon mold of such a shape and size that it is cast into a cylindrical rod about $\frac{1}{4}''$ in diameter so as to produce a bar of the alloy of substantially that size. The alloy is then swaged or worked into a rod of any suitable diameter or shape. The swaging or working is done cold, and, during the swaging operation the metal is annealed after about every three drafts by heating to about 600 degrees and allowing to cool in the air. The rods or bars thus made are then ready for use for contact or magneto point manufacture.

The alloy thus produced is white in color and has a specific gravity of 10.3 and it has about the same ductility as silver and can be readily swaged or worked cold as above stated and thus can be easily worked on a heading or riveting machine into any desired shape.

Having thus described my invention what I claim as new and desire to secure by Letters Patent is:

1. A metal alloy containing 77 to 80% silver and 18% to 20% copper, 2 to 3% platinum.

2. A metal alloy containing approximately 2½% platinum and the remaining parts silver and copper in substantially the proportions of four parts of silver to one part of copper.

3. A metal alloy containing approximately 80% silver, approximately 3% platinum, and copper.

4. A metal alloy containing approximately 80% of silver and approximately 20% of copper and platinum.

5. A metal alloy containing approximately 3% of platinum and approximately 97% of silver and copper, in the approximate proportion of 4 to 1.

6. A metal alloy containing approximately 18% of copper and approximately 82% of silver and platinum, in the approximate proportion of 35 to 1.

7. A metal alloy containing approximately 80% of silver, approximately 18% of copper, and platinum.

In witness whereof, I have hereunto set my hand at Weehawken, county of Hudson, State of New Jersey, this 22nd day of August, 1919.

JOSEPH ANTHONY WEIGER.

In presence of—

GEORGE W. DEWEY.